United States Patent
Vasconcelos et al.

(10) Patent No.: US 12,371,377 B2
(45) Date of Patent: Jul. 29, 2025

(54) PROCESS FOR OBTAINING SYNTHETIC GEOPOLYMERS AND SYNTHETIC GEOPOLYMERS

(71) Applicants: Petróleo Brasileiro S.A.—Petrobras, Rio de Janeiro (BR); Universidade Federal De Minas Gerais—UFMG, Belo Horizonte (BR)

(72) Inventors: Wander Luiz Vasconcelos, Nova Lima (BR); Jailton Ferreira Do Nascimento, Rio de Janeiro (BR); Jéssica De Oliveira Notório Ribeiro, Lavras (BR); Daniela Cordeiro Leite Vasconcelos, Nova Lima (BR); Mariana Arruda Pereira, Ouro Branco (BR)

(73) Assignees: Petróleo Brasileiro S.A.—Petrobras, Rio de Janeiro (BR); Universidade Federal De Minas Gerais—UFMG, Belo Horizonte (BR)

( * ) Notice: Subject to any disclaimer, the term of this patent is extended or adjusted under 35 U.S.C. 154(b) by 452 days.

(21) Appl. No.: 17/943,612

(22) Filed: Sep. 13, 2022

(65) Prior Publication Data
US 2023/0109878 A1 Apr. 13, 2023

(30) Foreign Application Priority Data
Sep. 15, 2021 (BR) ...................... 10 2021 018318 7

(51) Int. Cl.
| | | |
|---|---|---|
| *C04B 28/00* | (2006.01) | |
| *C04B 22/06* | (2006.01) | |
| *C04B 22/16* | (2006.01) | |
| *C04B 40/00* | (2006.01) | |
| *C04B 103/00* | (2006.01) | |
| *C04B 103/10* | (2006.01) | |
| *C04B 103/40* | (2006.01) | |

(52) U.S. Cl.
CPC .......... *C04B 28/006* (2013.01); *C04B 22/062* (2013.01); *C04B 22/165* (2013.01); *C04B 40/0042* (2013.01); *C04B 40/0082* (2013.01); *C04B 2103/0093* (2013.01); *C04B 2103/10* (2013.01); *C04B 2103/404* (2013.01)

(58) Field of Classification Search
CPC ... C04B 28/006; C04B 22/062; C04B 22/165; C04B 40/0042; C04B 40/0082; C04B 2103/0093; C04B 2103/10; C04B 2103/404; C04B 14/047
See application file for complete search history.

(56) References Cited

FOREIGN PATENT DOCUMENTS

| | | |
|---|---|---|
| BR | 102018012455 A2 | 1/2020 |
| CN | 103500594 A | 1/2014 |
| CN | 103920457 A | 7/2014 |
| CN | 105921102 A | 9/2016 |
| CN | 106467378 A | 3/2017 |
| CN | 108640542 B | 12/2020 |
| JP | 2008254939 A | 10/2008 |
| JP | 2016078017 A | 5/2016 |
| KR | 101687349 B1 | 12/2016 |
| WO | 2018159947 A1 | 9/2018 |

OTHER PUBLICATIONS

Andrejkovicova et al. (Jun. 2016) "The Effect Of Natural Zeolite On Microstructure, Mechanical And Heavy Metals Adsorption Properties Of Metakaolin Based Geopolymers", Applied Clay Science, 126:141-152.
Cheng et al. ( Feb. 2012) "The Heavy Metal Adsorption Characteristics On Metakaolin-based Geopolymer", Applied Clay Science, 56:90-96.
Ge et al. (Mar. 2017) "Facile Fabrication of Green Geopolymer/alginate Hybrid Spheres for Efficient Removal of Cu (Ii) in Water: Batch and col. Studies", Chemical Engineering Journal, 311:126-134(34 pages).
He et al. (Nov. 2013) "Preparation of Self-Supporting NaA Zeolite Membranes Using Geopolymers", Journal of Membrane Science, 447:66-72.
Kara et al. (Apr. 2017) "Metakaolin Based Geopolymer As An Effective Adsorbent For Adsorption Of Zinc(ii) And Nickel(ii) Ions From Aqueous Solutions", Applied Clay Science, 139:54-63.
Krol et al. (Dec. 2017) "Conditions of Synthesis and Structure of Metakaolin-based Geopolymers: Application as Heavy Metal Cation Sorbent", Polish Journal of Chemical Technology, 19(4):103-109.
Lee et al. (Jul. 2016) "Synthesis Of Mesoporous Geopolymers Containing Zeolite Phases By A Hydrothermal Treatment", Microporous and Mesoporous Materials, 229:22-30(37 pages).
Minelli et al. (Feb. 2018) "Characterization of Novel Geopolymer—Zeolite Composites as Solid Adsorbents for CO2 Capture", Chemical Engineering Journal, 341:505-515(41 pages).
Minelli et al. (Apr. 2016) "Geopolymers as Solid Adsorbent for CO2 Capture", Chemical Engineering Science, 148:267-274(37 pages).
Papa et al. (Jan. 2018) "Zeolite-geopolymer Composite Materials: Production and Characterization", Journal of Cleaner Production, 171:76-84(32 pages).

(Continued)

*Primary Examiner* — Anthony J Green

(57) ABSTRACT

The present invention relates to a geopolymer produced from a synthetic aluminosilicate. The synthetic aluminosilicate was produced by sol gel technology, heat treated and, later, activated using sodium silicate and sodium hydroxide in solution, having as a final product a synthetic geopolymer. The final product was submitted to $CO_2$ adsorption analysis using thermogravimetry for adsorbed quantification. In addition to the pure geopolymer, it is also possible to produce the synthetic geopolymer with the addition of surfactant, or in the composite form with the addition of zeolite, or heat treated to form a zeolite or functionalized with amine, for example, to increase the adsorption capacity.

15 Claims, 2 Drawing Sheets

(56) References Cited

OTHER PUBLICATIONS

Sarkar (May 2018) "Synthesis Of Mesoporous Geopolymeric Powder From LD Slag As Superior Adsorbent For Zinc (II) Removal", Advanced Powder Technology, 29(5):1142-1152.
Singhal et al. (Dec. 2017) "CTAB Modified Large Surface Area Nanoporous Geopolymer with High Adsorption Capacity for Copper ion Removal", Applied Clay Science, 150:106-114.
Tan et al. (May 2017) "Insight Into The Adsorption Kinetics Models For The Removal Of Contaminants From Aqueous Solutions", Journal of the Taiwan Institute of Chemical Engineers, 74:25-48.
Tang (Dec. 2015) "Preparation And Characterization Of Porous Metakaolin-based Inorganic Polymer Spheres As An Adsorbent", Materials & Design, 88:1244-1249.
Tang et al. (Aug. 2016) "Study On Synthesis And Characterization Of ZSM-20 Zeolites From Metakaolin-based Geopolymers", Applied Clay Science, 129:102-107.
Wang et al. (Jan. 2018) "Solidification/stabilization Mechanism of Pb(II), Cd(II), Mn(II) and Cr(III) in Fly Ash Based Geopolymers", Construction and Building Materials, 160:818-827.

PROCESS FOR OBTAINING SYNTHETIC GEOPOLYMERS AND SYNTHETIC GEOPOLYMERS

CROSS-REFERENCE TO RELATED APPLICATION

This application claims priority to Brazilian Application No. 10 2021 018318 7, filed on Sep. 15, 2021, and entitled "PROCESS FOR OBTAINING SYNTHETIC GEOPOLYMERS AND SYNTHETIC GEOPOLYMERS," the disclosure of which is incorporated herein by reference in its entirety.

FIELD OF THE INVENTION

The present invention relates to a process for obtaining geopolymers by sol gel process, from a source of Si and Al, with application in the gaseous adsorption of $CO_2$. The described geopolymer is a synthetic material, produced from the activation of a synthetic aluminosilicate. The modification of the pore structure and/or the functionalization of the geopolymers thus produced, increases their adsorbent capacity.

DESCRIPTION OF THE STATE OF THE ART

The geopolymer is a hydrated aluminosilicate mineral, being materials with Si and Al activated with solutions of medium to high alkalinity. It can be said that several small molecules, known as polymers, are combined into a network, joined by covalent bonds, forming a three-dimensional structure as described by DAVIDOVITS, J. "Geopolymer Chemistry and Applications", 3rd edition, Sanit-Quentin, France, 2011.

Geopolymers stand out for the following characteristics, compared to Portland cement concrete: they emit between 80% and 85% less $CO_2$, are immune to alkali-aggregate (ARA) type reactions, have high mechanical properties and, in general, they have high fire resistance, high inertia and chemical stability, as mentioned by PINTO, A. "Introduction to the study of geopolymers", Vila Real, 2006.

Currently, many works involving the environment have been carried out due to the importance of the theme in the view of environmental pollution. In this way, the technological development of materials capable of adsorbing polluting compounds becomes relevant. Some materials used as gas adsorbents can be mentioned, such as: metal organic framework (MOF), activated carbon, zeolites, mesoporous silicas (SBA), etc. However, these materials have reduced mechanical resistance and, some of them, have a very high production cost, in addition to production limitations.

Taking into account the properties and productive versatility, the geopolymer has become the target of research aimed at its application as an adsorbent material. There are some works that evaluated the application of geopolymers obtained from metakaolin, slag and ash, as adsorbent material, including for $CO_2$ capture. However, these raw materials may have impurities that do not participate in the geopolymerization reactions.

The geopolymer traditionally has a macropore structure and has a high mechanical resistance. However, when it comes to adsorbent material, one of the most desired characteristics is high porosity, leading to an increase in the specific area available for interaction with the adsorbate.

Carbon dioxide is one of those responsible for environmental pollution and the greenhouse effect, being the focus of international agreements aimed at controlling its emission into the atmosphere. In several industrial processes, this gas is inevitably released and an alternative to minimize this release is the use of materials that can adsorb it.

Among the materials used for carbon dioxide adsorption, geopolymers are widely taught in the literature, being produced with different raw materials, production routes, treatments and functionalizations as will be discussed below.

Document CN 108640542 refers to a geopolymer that solidifies heavy metals and stores $CO_2$, using blast furnace slag as raw material, the geopolymer being treated and functionalized differently to assess its adsorption capacity.

Document WO 2018159947 relates to a zeolite and its manufacturing method. This zeolite is produced by a hydrothermal synthesis reaction from a geopolymer slurry, in which industrial residual ash, slag and an alkaline activator are mixed. Afterwards, the material is subjected to adsorption analysis using concrete blocks and prefabricated products for water and air purification.

Document CN 106467378 refers to a method for synthesizing a filter membrane, from a mixture of metakaolin and red mud, adding phosphoric acid to obtain a geopolymer paste. A foaming agent was also used to modify the porosity. Subsequently, the adsorption capacity of heavy metal ions was analyzed.

Document KR 101687349 discloses a zeolite used as an adsorbent and its method of preparation. A block-shaped geopolymer, which can be used to purify water and air, is synthesized by mixing fly ash and slag, and transformed into zeolite (crystalline) using a hydrothermal reaction.

Document CN 105921102 describes a method of preparing a geopolymer comprising a hydrothermal reaction involving metakaolin and an activating agent to obtain a heavy metal absorbent in wastewater.

Document JP 2016078017 describes a method of obtaining geopolymer used as a gas adsorbent.

Document CN 103920457 relates to a method of preparing a geopolymer, used with heavy metal adsorbent, produced from red mud from the Bayer process. According to the invention, kaolin and red mud are used, however the mud has the main function of filling, not participating in the geopolymerization reactions. The kaolin, after calcination and grinding, is mixed with the red mud and activated with NaOH.

Document CN 103500594 describes an integrated adsorption-solidification treatment system for low-level radioactive waste.

Document JP 2008254939 describes a production process of a high resistance geopolymer prepared by mixing kaolin burned between 850° C. and 950° C., activated filler and water.

The article by MINELLI, M. et al. (2018) "Characterization of novel geopolymer-Zeolite composites as solid adsorbents for $CO_2$ capture", Chemical Engineering Journal, v. 341, p. 505 to 515, describes the production of a composite material formed by Na13X zeolite incorporated in a geopolymer matrix (from metakaolin) for low temperature $CO_2$ capture applications.

The study of SINGHALA, A.; GANGWARB, B. P.; GAYATHRY, J. M. (2017) "CTAB modified large surface area nanoporous geopolymer with high adsorption capacity for copper ion removal", Applied Clay Science, v. 150, p. 106 to 114, describes the production of a nanoporous geopolymer for adsorption of copper ions, synthesized with and without the use of cetyltrimethylammonium bromide (CTAB), by condensation of the mixture of metakaolin and alkaline solution.

The reference YUANYUAN, G. et al. (2017) "Facile fabrication of green geopolymer/alginate hybrid spheres for efficient removal of Cu(li) in water: Batch and column studies", Chemical Engineering Journal, v. 311, p. 126 to 134 describes a geopolymer produced in the form of hybrid alginate spheres made from a geopolymer slurry and sodium alginate. This material was used as an adsorbent for the removal of Cu(II) in water. The geopolymer was produced from metakaolin activated in sodium hydroxide solution.

The article by MINELLI, M. et al. (2016) "Geopolymers as solid adsorbent for $CO_2$ capture", Chemical Engineering Science, v. 148, p. 267 to 274, relates to a study of the performance of geopolymers as adsorbents for $CO_2$ and light gases ($CH_4$ and $N_2$), through a volumetric method in the sub-atmospheric pressure range. The samples were produced by the reaction of a metakaolin powder with an alkaline solution in different ratios.

The authors of the article HE, Y. et al. (2013) "Preparation of self-supporting NaA zeolite membranes using geopolymers", Journal of Membrane Science, v. 447, p. 66 to 72, manufactured a self-supporting, high-resistance NaA zeolite membrane from a geopolymer produced by in situ hydrothermal processing. The material was used for desalination through the vaporization process. The geopolymer was produced from a synthetic aluminosilicate, using tetraethyl-orthosilicate (TEOS) and aluminum nitrate nonahydrate (ANN) as raw material, being an acid production route. Subsequently, the geopolymer was subjected to a hydrothermal process forming a zeolite A and its desalination capacity was evaluated.

The study by KROL, M. et al. (2015) "Conditions of synthesis and structure of metakaolin-based geopolymers: application as heavy metal cation sorbent", Polish Journal of Chemical Technology, v. 19, teaches the synthesis of geopolymer materials designed for application as self-supporting zeolite membranes. As raw material, metakaolin activated with sodium silicate and sodium hydroxide were used. The composition of the raw materials and the activation temperature were selected in order to correspond to the basic chemical compositions and the conditions of synthesis of sodalite, as well as zeolites A and X. Additionally, the structural properties of the geopolymers were determined. The results show that it is possible to obtain structures composed of zeolite in an amorphous matrix. The synthesized materials were used in the sorption of some selected heavy metal cations ($Ni^{2+}$, $Zn^{2+}$, $Pb^{2+}$ and $Cd^{2+}$).

The article by KARA, I.; TUNC, D. Y.; AKAR, S. T. (2017) "Metakaolin based geopolymer as an effective adsorbent for adsorption of zinc(II) and nickel(II) ions from aqueous solutions", Applied Clay Science, v. 139, p. 54 to 63, describes the production of a geopolymer, from metakaolin, which was evaluated as an adsorbent to remove Zn (II) and Ni(II) ions from an aqueous solution.

The study by PAPA, E. et al. (2018) "Zeolite-geopolymer composite materials: Production and characterization", Journal of Cleaner Production, v. 171, p. 76 to 84 reports the production and characterization of a geopolymer-zeolite composite obtained by adding a commercial synthetic zeolite to a geopolymer matrix, to combine the micro-porosity of the zeolite with the meso-porosity of the geopolymer matrix. The material was obtained by mixing different geopolymer matrices based on metakaolin with zeolite Na13X. The composites were tested as $CO_2$ adsorbents and the zeolite used in this study was Y, in addition other treatments and functionalization were analyzed.

In the article by SARKAR, C.; BASU, J. K.; SAMANTA, A. N. (2018) "Synthesis of mesoporous geopolymeric powder from LD slag as superior adsorbent for Zinc(II) removal", Advanced Powder Technology, v. 29, p. 1142 to 1152, a geopolymer produced from LD slag (Linz Donawitz) as adsorbent of zinc (II) ions from effluents was studied.

The study of LEE, N. K.; KHALID, H. R.; LEE, H. K. (2016) "Synthesis of mesoporous geopolymers containing zeolite phases by a hydrothermal treatment", Microporous and Mesoporous Materials, v. 229, p. 22 to 30 investigates the synthesis of mesoporous geopolymers containing different phases of nanocrystalline zeolite. A hydrothermal treatment procedure was used to synthesize the geopolymers mesoporous compounds from fly ash and slag activated with an alkaline solution.

The article by TANG, Q. et al. (2015) "Preparation and characterization of porous metakaolin-based inorganic polymer spheres as an adsorbent", Materials and Design, v. 88, p. 1244 to 1249, refers to the production of geopolymer for the adsorption of metal ions from metakaolin. Further another reference by TANG, Q. et al. (2016) "Study on synthesis and characterization of ZSM-20 zeolites from metakaolin-based geopolymers", Applied Clay Science, v. 129, p. 102 to 107, describes the production of a zeolite from a hydrothermal process treatment performed on geopolymers produced with metakaolin. Then, the porosity of the material was analyzed.

The work of ANDREJKOVICOVÁ, S. et al. (2016) "The effect of natural zeolite on microstructure, mechanical and heavy metals adsorption properties of metakaolin based geopolymers", Applied Clay Science, v. 126, p. 141 to 152, investigated the effect of clinoptilolite, a natural zeolite, as filler, on the mechanical performance and adsorption capacity of heavy metals in metakaolin-based geopolymers. The metal ion adsorption capacity of the final material was evaluated.

The article by CHENG, T. W. et al. (2012) "The heavy metal adsorption characteristics on metakaolin-based geopolymer", Applied Clay Science, v. 56, p. 90 to 96, describes the study of a metakaolin-based geopolymer used as an adsorbent for heavy metal ions.

The work of WANG, Y.; HAN, F.; MU, J. (2018) "Solidification/stabilization mechanism of Pb(II), Cd(II), Mn(II) and Cr(III) in fly ash based geopolymers", Construction and Building Materials, v. 160, p. 818 to 827, evaluated the stabilization of metals in a geopolymer matrix produced from silicate-activated fly ash and sodium hydroxide.

Therefore, the literature presents different raw materials, production processes and adsorbates. The geopolymer production process described in the present invention differs from all the processes described in the bibliographic references because it is a material obtained by the sol gel process, from a source of Si and Al. All mentioned references are from ready-made aluminosilicate sources, for example, metakaolin, slag and ash. The synthesis of the geopolymer from the elements Si and Al allows changes in the structure of the material and, consequently, in its properties, in a controlled environment. The process described, in addition to producing a material of high purity, stands out for its productive versatility and superior mechanical resistance when compared to geopolymers obtained from ready-made aluminosilicates.

Therefore, no prior art document discloses a synthetic geopolymer as a $CO_2$ adsorbent such as the present invention.

The geopolymer of the present invention proves to be competitive for application as an adsorbent since it also has a structural function and is produced at lower costs compared to other adsorbents, such as Metals Organics Frameworks. In addition, because the synthetic geopolymer is produced from a pure raw material, its properties can be controlled, unlike geopolymers obtained with the use of metakaolin, slag and ash, which have impurities that interfere with the final properties, depending on of what is desired to adsorb or produce.

BRIEF DESCRIPTION OF THE INVENTION

The present invention relates to a process of producing a geopolymer from the activation of a synthetic raw material, with application in the gaseous adsorption of $CO_2$, in which a synthetic aluminosilicate obtained by a sol gel route is used for the production of a synthetic geopolymer. This process aims to modify the pore structure and/or the functionalization of geopolymers produced from a synthetic aluminosilicate, to increase its adsorbent capacity, which comprises the following steps: 1) modifying the microstructure through the incorporation of pores with the addition of surfactant or other porogenic agent; 2) forming geopolymer/zeolite composite; 3) thermal treating geopolymers since, from a certain temperature, the material becomes a zeolite, that is, it passes from an amorphous nature to a crystalline structure and, 4) functionalizing by adding a component from the amine group.

BRIEF DESCRIPTION OF DRAWINGS

The present invention will be described in more detail below, with reference to the attached figures which, in a schematic and non-limiting manner of the inventive scope, represent examples of its realization. In the drawings, there are.

DETAILED DESCRIPTION OF THE INVENTION

Figure 1:
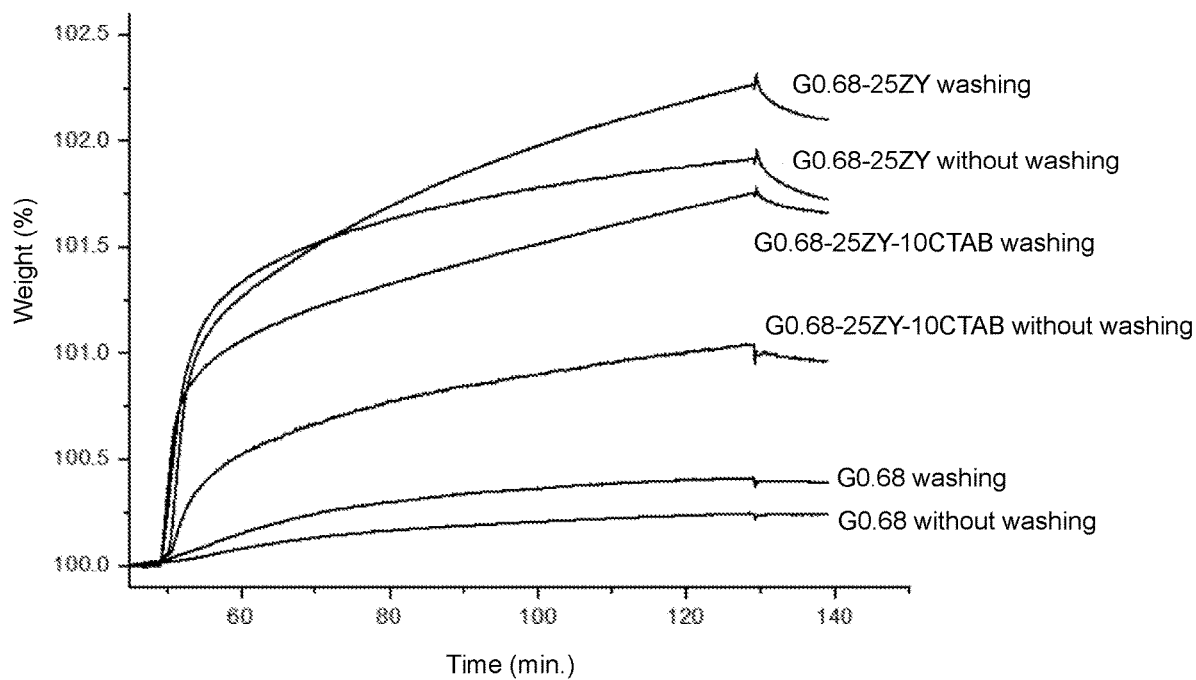
FIG. 1 illustrating the $CO_2$ adsorption curves of the geopolymers with molar ratio $Na_2O/SiO_2$=0.68 after the washing process and without washing.

The present invention relates to a process of producing a geopolymer from the activation of a synthetic aluminosilicate, with application in the gas adsorption of $CO_2$. The synthetic aluminosilicate was produced by a sol gel process, as described in patent application BR 102018012455, heat treated and, later, synthesized using sodium silicate and sodium hydroxide in solution, having as a final product a synthetic geopolymer. The final product was submitted to $CO_2$ adsorption analysis using thermogravimetry to quantify the adsorbed $CO_2$.

The aluminosilicate obtained by sol gel technology was subjected to calcination temperatures between 300° C. and 900° C., followed by basic activation with sodium silicate and sodium hydroxide, which may also undergo acid activation with phosphoric acid. The sodium silicate used has from 5% to 20% $Na_2O$ and 5% to 50% $SiO_2$.

Initially, solutions were prepared containing: water, silicate and sodium hydroxide. The mixtures remained at rest and at room temperature for at least 10 minutes. The ratios were stipulated based on bibliographic reviews, adopting maximum and minimum conditions for the addition of $Na_2O$.

For the production of geopolymer pastes, the silicate and sodium hydroxide solution prepared previously was mixed with the synthetic powder in a container kept in an ice bath to minimize the effects of temperature, since the reaction is exothermic. Furthermore, the temperature has a catalytic effect, accelerating the geopolymerization reactions, which would make it difficult to mold the pastes. Optionally, it is possible to add a zeolite to the mixture (water/sodium silicate/sodium hydroxide solution+synthetic powder), such as zeolite Y, for example, to form the composite.

The geopolymer pastes after one minute of mixing were poured into cylindrical acrylic molds with dimensions of 5×10 mm. After the molding process was completed, the mold was sealed and placed in an oven for 24 hours at a temperature of 60° C. Subsequently, the specimens were unmoulded and kept at a temperature of 60° C. until the final curing age, from 10 minutes, until the desired final resistance. The curing temperature adopted, above room temperature, aims to accelerate the geopolymerization reactions, however, it is possible to perform it at room temperature. After the final curing, optionally, a heat treatment at a temperature above 200° C. can be used to form zeolite.

Furthermore, after the final curing step, optionally a step of functionalization of the sample by means of the impregnation of a component of the group of amines. Impregnation consists of preparing a solution between 1% and 50% of an amine, for example, diethyl triamine in a solvent, for example, ethanol, leaving it under stirring for 1 minute to 1 hour, then adding the geopolymer samples, keeping stirring for 3 to 24 hours. Subsequently, it was dried in an oven for 10 minutes to 12 hours at a temperature of 40° C. to 80° C.

Optionally, a surfactant may be incorporated during the step of mixing the prepared solution (water/sodium silicate/sodium hydroxide) with the synthetic powder, in which the surfactant cetyl trimethylammonium (CTAB) is moistened so as not to change the initial viscosity of the geopolymer. Then the samples are molded.

Optionally, the geopolymers obtained can be subjected to a washing process to remove excess unreacted sodium during the geopolymerization process, aiming at the release of pores.

The adsorption capacity of the samples was determined by thermogravimetric analysis as described in the following examples.

The thermogravimetric analyzes consisted of the following methodologies:

Condition (1): treating the materials at 100° C. for 30 minutes, cooling to 30° C. and keeping at that temperature for 5 minutes for stabilization, these steps being in a $N_2$ atmosphere with a gas flow of 50 ml/min. Then, changing the atmosphere to $CO_2$ (50 ml/min), keeping the temperature at 30° C. for 90 minutes, followed by desorption again in a $N_2$ atmosphere for 10 minutes.

Condition (2): treating the materials at 300° C. for 30 minutes, cooling up to 30° C. and keeping at that temperature for 30 minutes for stabilization, these steps being in a $N_2$ atmosphere with a gas flow of 50 ml/min. Then, changing the atmosphere to $CO_2$ (50 ml/min), keeping the temperature at 30° C. for 90 minutes, followed by desorption again in a $N_2$ atmosphere for 10 minutes.

The objective of the heat treatment at a temperature above 200° C. is the transformation of the geopolymer (amorphous structure) into zeolite (crystalline structure), to assess whether this modification would influence the adsorption capacity of the material.

It is possible to produce geopolymer for adsorption of $CO_2$ and other adsorbates with other molar ratios, being able to increase the porosity of the final material, allowing a greater adsorption capacity or decreasing the porosity, increasing the mechanical resistance. It is also possible to activate the geopolymer through another alkaline solution such as, for example, potassium silicate, or even acid activation.

It is also possible, in addition to the value quoted in the text, to add a greater or lesser amount of zeolite for the formation of the geopolymer-zeolite composite. And any other zeolite compatible with the geopolymer can be used instead of zeolite Y. In addition, other adsorbent materials can also be used for this composite to replace zeolite, such as activated carbon, for example.

Other metals can be introduced in the production phase of the aluminosilicate, aiming to change the adsorption capacity of the geopolymer or for doping effect.

The effectiveness of the treatment processes and additions made to the mixture, which act by altering some characteristic, is also dependent on the molar relationship between the analyzed geopolymer and components used in the production of the material (productive trait), thus, these factors can increase or decrease the adsorption capacity of the final material.

The porosity generated in the geopolymer through the use of CTAB can come from other surfactants or porogenic agents according to the order of magnitude of the pore size to be created. Examples of other compounds that can be used for this purpose (non-limiting): surfactant Pluronic P123, Pluronic F127, Brij 58, Brij 30, starch, sucrose, etc.

It is also possible the functionalization of geopolymer samples with other functional groups besides amines, such as: amide, sultan, thiol, carbonyl, carboxyl, phosphate, among others.

EXAMPLES

The examples presented below are intended to illustrate some forms of embodiment of the invention, as well as to prove the practical feasibility of its application, not constituting any form of limitation of the invention.

To analyze the adsorption capacity of the geopolymer, different samples were prepared. Different formulations were tested, in addition to functionalization with an amine group, specifically diethyl triamine (DT) in order to increase the active sites. Another modification studied was the addition of a surfactant, cetyl trimethylammonium bromide (CTAB), in the geopolymer paste for incorporation of mesopores. Furthermore, geopolymer-zeolite composites were produced. The adsorption capacity of the zeolite formed from these geopolymers was evaluated. The formation of zeolite occurred due to the heating of the geopolymers, during the thermogravimetric analysis, at 300° C.

Example 1

A geopolymer was produced as described above, with a molar ratio of $Na_2O/SiO_2$ of 0.68 to G0.68. Curing was carried out for a period of 72 hours at 60° C. At the end of the curing process, part of the samples was submitted to the washing process, as detailed above. Subsequently, the $CO_2$ adsorption capacity was evaluated as follows: heating the samples at 100° C. for 30 minutes to remove the adsorbed water; cooling to 30° C. and keeping at that temperature for 5 minutes for stabilization, these steps being in a $N_2$ atmosphere with a gas flow of 50 ml/min. Then, changing the atmosphere to $CO_2$ (50 ml/min), keeping the temperature at 30° C. for 90 minutes, followed by desorption again in the $N_2$ atmosphere for 10 min.

As shown in FIG. 1, it is noted that the washing process contributed to the increase in adsorption capacity from 0.2%, G0.68 without washing, to 0.4% G0.68 washed.

Example 2

A geopolymer was produced as described in the detail text, with a molar ratio of $Na_2O/SiO_2$ of 0.68 to G0.68, however, in the fresh geopolymer paste 25% of Zeolite Y was added, previously moistened. Curing and adsorption analyzes were performed as per Example 1.

As shown in FIG. 1, it is noted that the washing process also contributed to the increase in adsorption capacity, going from 1.9%, G0.68-25ZY without washing, to 2.3% G0.68-25ZY washed. Furthermore, the incorporation of zeolite in the geopolymer increases the adsorption capacity.

Example 3

A geopolymer was produced as described in the detail text, with a molar ratio of $Na_2O/SiO_2$ of 0.68, however, in the fresh geopolymer paste was added 25% of Zeolite Y and 10% of CTAB, previously moistened so as not to disturb paste consistency—G0.68-25ZY-10%. Curing and adsorption analyzes were performed as per Example 1.

According to FIG. 1, it is noted that the washing process also contributed to the increase in adsorption capacity from 1.0%, G0.68-25ZY-10CTAB without washing, to 1.8% G0.68-25ZY-10CTAB washed. Furthermore, the incorporation of zeolite and CTAB in the geopolymer increases the adsorption capacity compared to the pure material G0.68.

Example 4:

Geopolymers were produced as described in Examples 1, 2 and 3, respectively being G0.68, G0.68-25ZY and G0.68-25ZY-10CTAB and all samples subjected to the washing process to remove excess sodium. Subsequently, the analysis of $CO_2$ adsorption took place as follows: treating the materials at 300° C. for 30 minutes to transform the geopolymer matrix into zeolite, cooling to 30° C. and maintaining at this temperature for 30 minutes for stabilization, these steps being in an atmosphere of $N_2$ with a gas flow of 50 ml/min, then changing the atmosphere to $CO_2$ (50 ml/min), keeping the temperature at 30° C. for 90 minutes, followed by desorption again in the $N_2$ atmosphere for 10 minutes.

Figure 2:
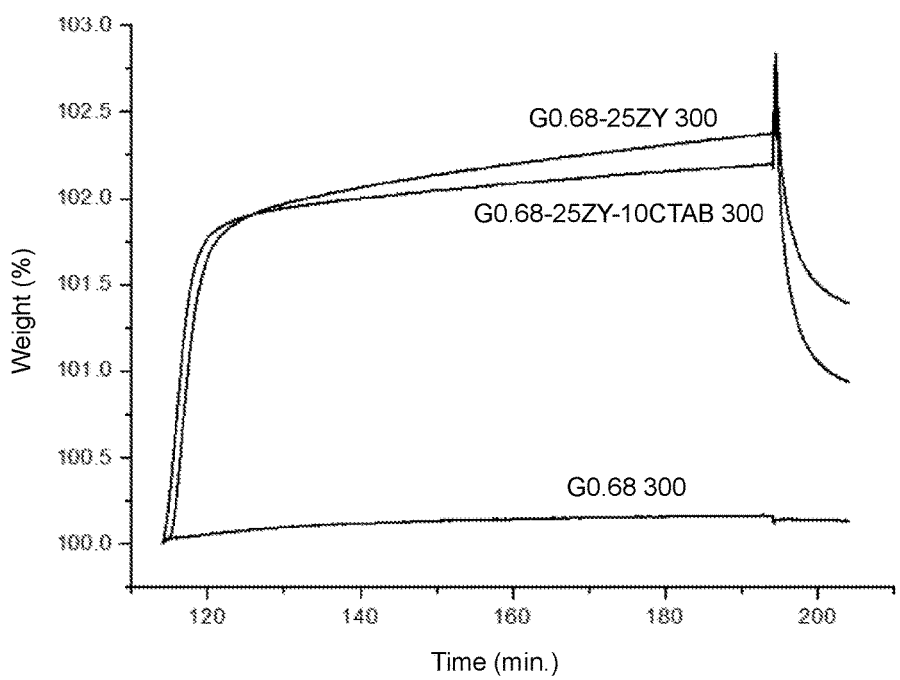
FIG. 2 illustrating the $CO_2$ adsorption curves of geopolymers with molar ratio $Na_2O/SiO_2$=0.68 after the washing process and submitted to 300° C. before $CO_2$ adsorption.

According to FIG. 2, it is noted that the adsorption capacities of samples G0.68-25ZY, G0.68-25ZY-10CTAB and G0.68 were 2.4%, 2.2% and 0.2%, respectively.

Example 5

A geopolymer was produced as described in the detail text, with a molar ratio of $Na_2O/SiO_2$=0.5–G0.50. Curing was carried out for a period of 72 hours at 60° C. At the end of the curing process, part of the samples was submitted to the washing process as detailed above. Subsequently, the $CO_2$ adsorption capacity was evaluated as follows: heating the samples at 100° C. for 30 minutes to remove the adsorbed water, cooling to 30° C. and maintaining at this temperature for 5 minutes for stabilization, these steps being in a $N_2$ atmosphere with gas flow of 50 ml/min. Then, changing the atmosphere to $CO_2$ (50 ml/min), keeping the temperature at 30° C. for 90 minutes, followed by desorption again in the $N_2$ atmosphere for 10 minutes.

Figure 3:
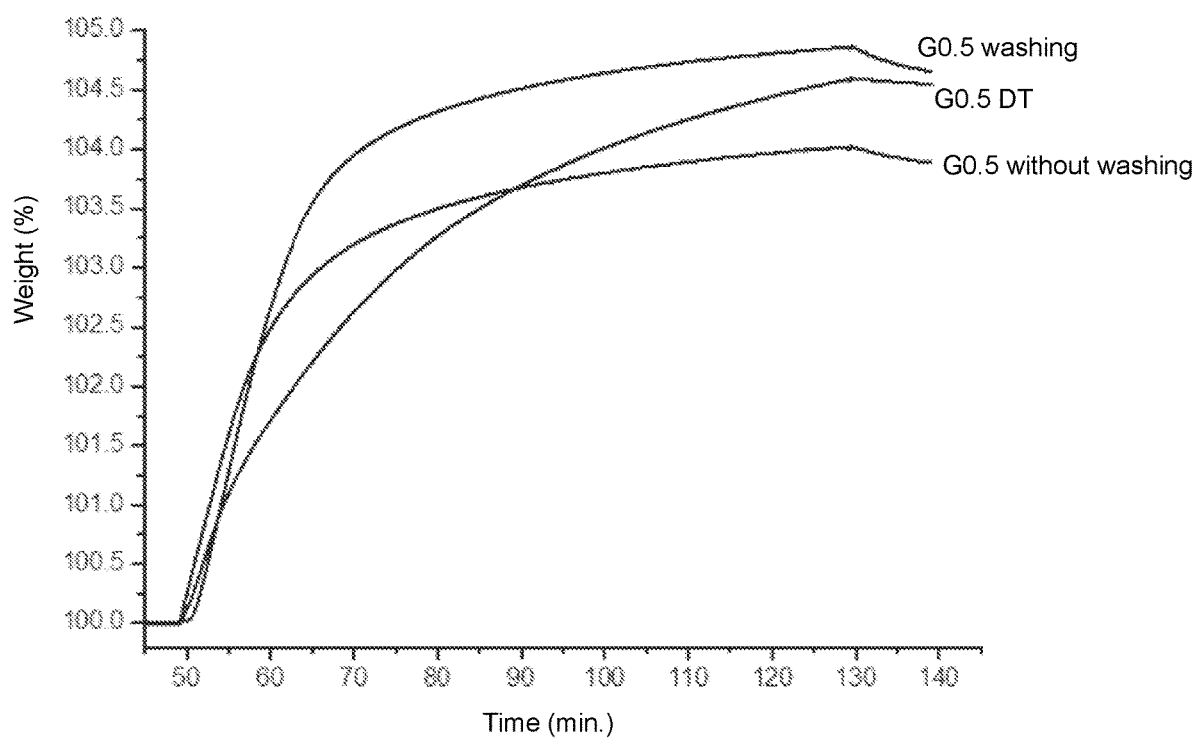
FIG. 3 illustrating the adsorption curves of geopolymers with molar ratio $Na_2O/SiO_2$=0.50 after the washing process, without washing and with the addition of diethyl triamine (DT).

As shown in FIG. 3, it can be seen that the washing process also contributed to the increase of the adsorption capacity for the molar ratio $Na_2O/SiO_2=0.5$, going from 4.0%, G0.50 without washing, to 4.9%, G0.50 washed.

Example 6

A geopolymer was produced as described in the detail text, with a molar ratio of $Na_2O/SiO_2=0.5$. Curing was carried out for a period of 72 hours at 60° C. At the end of the curing process, the samples were submitted to the washing process as detailed above. Subsequently, the samples were functionalized with material from the amine group, more specifically diethyl triamine (DT) as follows: preparing a 5% solution of diethyl triamine in ethanol, leaving under stirring for 10 minutes, then adding the geopolymer samples keeping stirring for 12 hours. Then, drying in an oven for 4 h at 60° C. The C02 adsorption capacity was evaluated as follows: heating the samples at 100° C. for 30 minutes to remove the adsorbed water, cooling until 30° C. and keeping at that temperature for 5 minutes for stabilization, these steps being in a $N_2$ atmosphere with a gas flow of 50 ml/min. Then, changing the atmosphere to $CO_2$ (50 ml/min), keeping the temperature at 30° C. for 90 minutes, followed by desorption again in the $N_2$ atmosphere for 10 minutes.

From FIG. 3 it can be seen that the functionalization with DT decreased the $CO_2$ adsorption rate, according to the slope of the curve.

Example 7

Geopolymers were produced as mentioned in Examples 5 and 6 and the adsorption curves shown in FIG. 3 were subjected to a kinetic analysis, according to the model suggested by TAN, K. L.; HAMEED, B. H. "Insight into the adsorption kinetics models for the removal of contaminants from aqueous solutions", Journal of the Taiwan Institute of Chemical Engineers, v. 74, p. 25 to 48, 2017. From this, the maximum adsorption capacity of the samples was estimated and the results shown in Table 1 were obtained. It is noted that, in principle, the highest adsorption capacity, in the exposure period of 90 minutes, was that of Example 6 (sample G0.5 washing). However, through the kinetic analysis, it was concluded that the G0.5 DT sample has a lower adsorption rate, but in longer periods (t, 300 minutes) it has a higher adsorption capacity than the G0.5 washing sample.

The synthetic geopolymers as obtained by the present invention have flexibility in their preparation and allow the production of geopolymers and zeolites from synthetic raw materials where possible to control the molar ratios between silica and alumina, generating products with controlled performance, which would be unfeasible from natural raw materials that have a restricted range of molar ratio between silica and alumina, such as those found in metakaolin, ash and slag. It is also possible to insert organic and inorganic additives in order to project their properties, such as the adsorption capacity of $CO_2$.

Synthetic geopolymers have a mechanical compressive resistance of 0 to 40 MPa, a surface area of 1 $m^2/g$ to 800 $m^2/g$, a pore structure that can present micro, meso and macropores and adsorption capacity of $CO_2$ from 0 to 100 milligrams of $CO_2$ per gram of geopolymer. These properties of geopolymers vary depending on the production processes used.

It should be noted that, although the present invention has been described in relation to the attached drawings, it may undergo modifications and adaptations by persons skilled in the art, depending on the specific situation, but provided that it is within the inventive scope defined herein.

The invention claimed is:

1. A process to produce synthetic geopolymers, the process comprising:
    preparing a solution containing water, sodium silicate, and sodium hydroxide and leaving the solution to rest at room temperature for at least 10 minutes;
    calcining a synthetic powder at a temperature between 300° C. and 900° C., followed by basic or acid activation, wherein the synthetic powder is a synthetic aluminosilicate;
    mixing the solution with the synthetic powder to obtain a geopolymer paste; and
    after mixing, waiting for a final cure, from 10 minutes, until a desired final mechanical resistance to compression of the geopolymer paste is achieved.

2. A process according to claim 1, wherein the aluminosilicate is obtained by sol gel technology.

3. A process according to claim 1, wherein the sodium silicate has from 5% to 20% of $Na_2O$ and 5% to 50% of $SiO_2$.

4. A process according to claim 1, further comprising functionalizing a geopolymer sample of the geopolymer paste through an impregnation of an amine after curing.

5. A process according to claim 4, wherein the impregnation comprises preparing a solution between 1% and 50%

TABLE 1

Maximum adsorption capacity of geopolymer samples with $Na_2O/SiO_2$ ratio = 0.50.

| Classification | y = A + Bx | | Balance adsorption | | Adsorption rate-k | Kinetic model correlation |
| --- | --- | --- | --- | --- | --- | --- |
| | A | B | $q_e$ (%) | t (min) for $q_e \geq 94\%$ | (%/min) | factor |
| G0.50 | 0.01684 | 0.00948 | 105.49 | 310 | 9.480E-03 | 0.9999 |
| G0.50 washing | 0.02189 | 0.00936 | 106.84 | 325 | 9.360E-03 | 0.9998 |
| G0.50 washing DT | 0.02949 | 0.00933 | 107.18 | 320 | 9.33E-03 | 0.9999 | of an amine in a solvent, leaving the solution stirring for 1 minute to 1 hour, adding the geopolymer sample while maintaining stirring from 3 to 24 hours and drying in an oven for 10 minutes to 12 hours at a temperature of 40° C. to 80° C.

6. A process according to claim 5, wherein the amine is diethyl triamine and the solvent is ethanol.

7. A process according to claim 1, further comprising incorporating a surfactant while mixing the solution.

8. A process according to claim 1, further comprising heat treating at a temperature above 200° C., after curing, to form zeolite.

9. A process according to claim 1, further comprising adding a zeolite while mixing the solution to form a composite.

10. A process according to claim 1, further comprising washing the geopolymer paste to remove excess unreacted sodium.

11. The process of claim 7, wherein the surfactant comprises cetyl trimethylammonium bromide (CTAB).

12. The process of claim 9, wherein the zeolite comprises zeolite Y.

13. The process of claim 1, wherein basic activation is used, wherein an alkaline activator used for base activation is sodium hydroxide or potassium hydroxide.

14. The process of claim 1, wherein acid activation is used, wherein an acid activator used for the acidic activation is phosphoric acid.

15. A synthetic geopolymer as obtained in claim 1, wherein the geopolymer has a mechanical resistance to compression from 0 to 40 MPa, surface area from 1 $m^2/g$ to 800 $m^2/g$, pore structure that can present micro, meso, and macropores and $CO_2$ adsorption capacity from 0 to 100 milligrams of $CO_2$ per gram of geopolymer.

* * * * *